(12) United States Patent
Lee

(10) Patent No.: US 9,756,984 B2
(45) Date of Patent: Sep. 12, 2017

(54) CONTAINER

(71) Applicant: Wen-Ching Lee, Taichung (TW)

(72) Inventor: Wen-Ching Lee, Taichung (TW)

( * ) Notice: Subject to any disclaimer, the term of this patent is extended or adjusted under 35 U.S.C. 154(b) by 398 days.

(21) Appl. No.: 14/508,871

(22) Filed: Oct. 7, 2014

(65) Prior Publication Data
US 2015/0238050 A1 Aug. 27, 2015

(30) Foreign Application Priority Data

Feb. 25, 2014 (CN) .................... 2014 2 0080341 U

(51) Int. Cl.
*A47J 43/046* (2006.01)
*A47J 43/07* (2006.01)
*B01F 15/00* (2006.01)

(52) U.S. Cl.
CPC ......... *A47J 43/046* (2013.01); *A47J 43/0727* (2013.01); *B01F 15/00876* (2013.01)

(58) Field of Classification Search
CPC  A47J 43/046; A47J 43/0727; B01F 15/00876
USPC .................. 366/205, 314; D7/413
See application file for complete search history.

(56) References Cited

U.S. PATENT DOCUMENTS

| | | | | |
|---|---|---|---|---|
| 7,063,456 B2 * | 6/2006 | Miller | ............ | A47J 43/046 366/205 |
| 7,350,963 B2 * | 4/2008 | Williams | ............ | A47J 43/0727 366/205 |
| 8,529,120 B2 * | 9/2013 | Ulanski | ............ | B01F 15/00831 241/282.1 |
| 8,834,015 B2 * | 9/2014 | White | ............ | A47J 43/046 241/282.2 |
| 9,114,369 B2 * | 8/2015 | Fouquet | ............ | B01F 7/162 |
| 9,283,528 B2 * | 3/2016 | Thai | ............ | A47J 43/046 |
| 2006/0176768 A1 * | 8/2006 | Williams | ............ | A47J 43/0727 366/205 |
| 2009/0114616 A1 * | 5/2009 | White | ............ | A47J 43/0722 215/307 |
| 2013/0215707 A1 * | 8/2013 | Fouquet | ............ | B01F 7/162 366/205 |
| 2013/0264403 A1 * | 10/2013 | Thai | ............ | A47J 43/046 241/191 |
| 2015/0238050 A1 * | 8/2015 | Lee | ............ | A47J 43/046 241/285.2 |
| 2015/0282671 A1 * | 10/2015 | Dickson, Jr. | ............ | B01F 7/1675 366/205 |

* cited by examiner

*Primary Examiner* — Tony G Soohoo
(74) *Attorney, Agent, or Firm* — Muncy, Geissler, Olds & Lowe, P.C.

(57) ABSTRACT

A container includes a blending base, an internal wall surface, and an internal bottom surface. The blending base is formed inside the container, extending upward slantwise from a peripheral edge of the internal bottom surface to the internal wall surface. The blending base includes a plurality of turning portions and extended curves at a top edge thereof. The extended curves are linked with the turning portions and cling to the internal wall surface. Thus, the blending base does not adversely affect the appearance of the container and can enhance the blending effect. In addition, the container can be washed and cleaned easily due to the blending base.

8 Claims, 5 Drawing Sheets

CONTAINER

BACKGROUND OF THE INVENTION

1. Field of the Invention

The present invention relates generally to a food processor and more particularly, to a container for a blender.

2. Description of the Related Art

In daily life, cups are popular commodities. For example, cups are sometimes used for brewing milk, oatmeal, eatable powders, etc. by means of a chopstick or a dipper for agitation. However, such manner is not only inconvenient but leads to non-uniform agitation. Since the mouthfeel of beverage mainly depends on degree of the agitation, the dissolubility based on such manner is worse to adversely affect the mouthfeel.

As the living standard of the modern people is heightened, small electric appliances, such as juicers, soya-bean milk grinders, and food processors, for self-made food are available in most of the families. Such small electric appliance is usually made of a cup-like main body and agitation blades for crushing food. While crushing the food, the blades also grind the food to make crushed food more uniform To increase the blending effect of the aforesaid cup-like main body, a cup-like member having long ribs is commercially available. The long ribs are formed on the internal wall of the cup-like member for enhancing the blending effect of the food. However, such long ribs not only adversely affect the appearance of the cup-like member but make it difficult to wash and clean the internal wall of the cup-like member.

SUMMARY OF THE INVENTION

The primary objective of the present invention is to provide a container, which can enhance the blending effect of crushed food without any adverse effect on the appearance of the container and reduce the difficulty of washing and cleaning the internal wall of the container.

The foregoing objective of the present invention is attained by the container having a blending base, an internal wall surface, and an internal bottom surface. The blending base is formed inside the container, extending upward slantwise from a peripheral edge of the internal bottom surface to the internal wall surface. The blending base includes a plurality of turning portions and extended curves at a top edge thereof. The extended curves are linked with the turning portions and cling to the internal wall surface.

Either two opposite ones of the turning portions are structurally symmetric. Either two adjacent ones of the turning portions are not as high as each other relative to the internal wall surface of the container. The extended curve therebetween is gradually inclined toward the lower turning portion from the higher turning portion. In this way, the food in agitation inside the container can be uniformly agitated.

Compared with the conventional cup having the long ribs, the container of the present invention can enhance the blending effect on the food without adverse effect on the appearance of the container and can be more easily washed and cleaned, making the internal wall surface smooth or arc-shaped to get rid of the limitation to the whole appearance of the container and any adverse effect resulting from the long ribs.

Detailed structures, features, operations, and effects of the present invention will be recited in the following paragraphs and illustrated in the following appended drawings. However, they are merely provided for reference and illustration without any intention to be used for limiting the present invention.

DETAILED DESCRIPTION OF PREFERRED EMBODIMENTS

Figure 1:
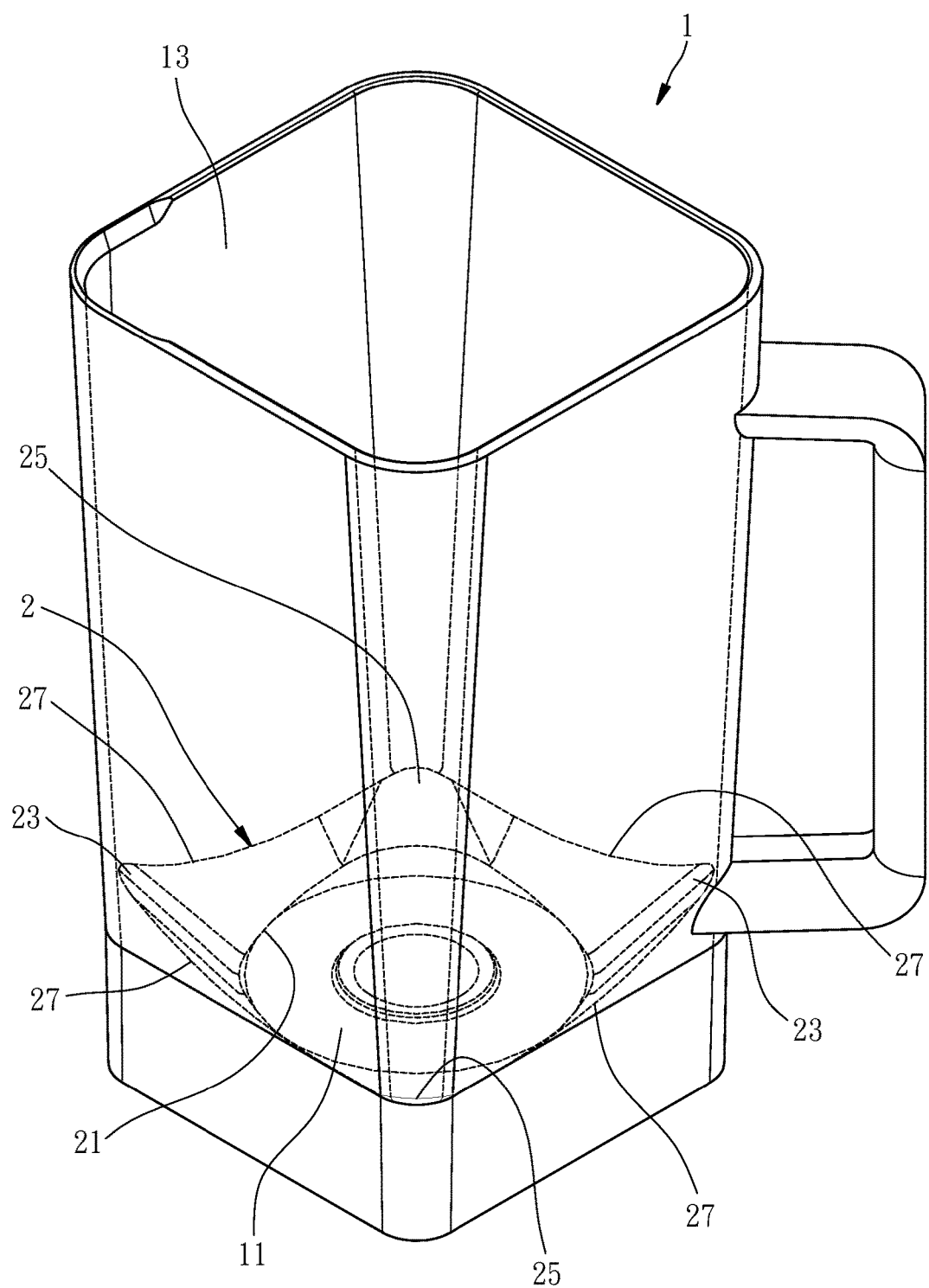
FIG. 1 is a perspective view of the present invention without any blade set.
Figure 2:
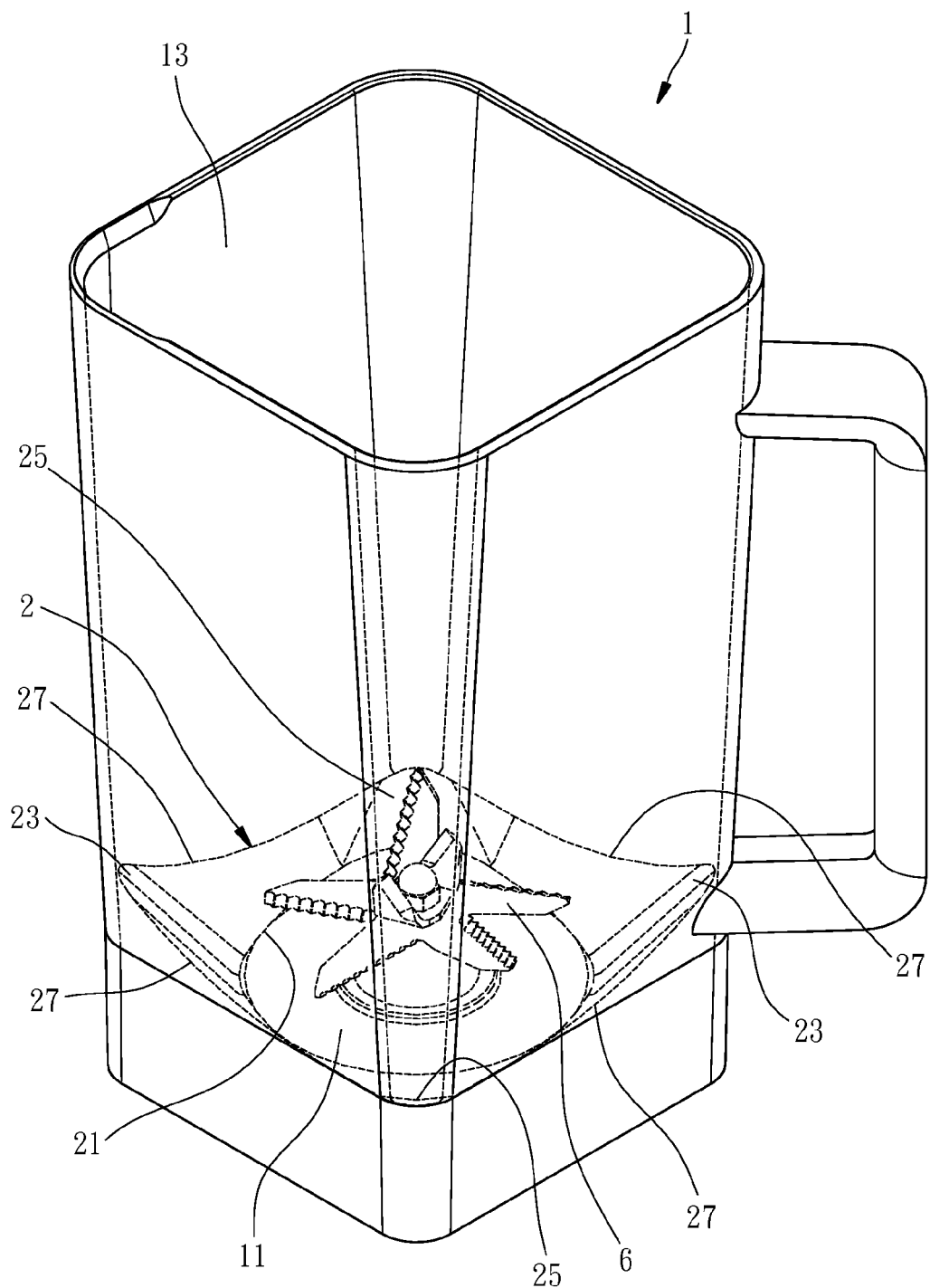
FIG. 2 is a perspective view of the present invention.

Referring to FIGS. 1 and 2, a container 1 constructed according to an embodiment of the present invention is a square transparent cup, as an example, having four round corners. The container 1 is applied to a blender (not shown) and includes a blending base 2. A blade set 6 is mounted inside the container 1 and located at the center of the blending base 2. The container 1 includes a flat internal surface. The blending base 2 and the container 1 are formed in one piece, so the blending base 2 does not adversely affect the whole appearance of the container 1 and makes the container 1 washed and cleaned more easily as compared with the conventional cup having long ribs formed at its internal surface.

The blending base 2 includes a bottom periphery 21 clinging to an internal bottom surface 11, extending upward slantwise from the internal bottom surface 11 of the container 1 to an internal wall surface 13 of the container 1. The blending base 2 includes four turning portions 23,25 and four extended curves 27 at a top edge thereof. The four extended curves 27 are linked with the turning portion 23,25 and cling to the internal wall surface 13. In this way, after food (not shown) inside the container 1 is crushed by the blade set 6, the crushed food or its juice (not shown) is agitated inside the container 1 and affected by resistance generated by the structure of the blending base 2 for preferable blending effect.

Figure 3:
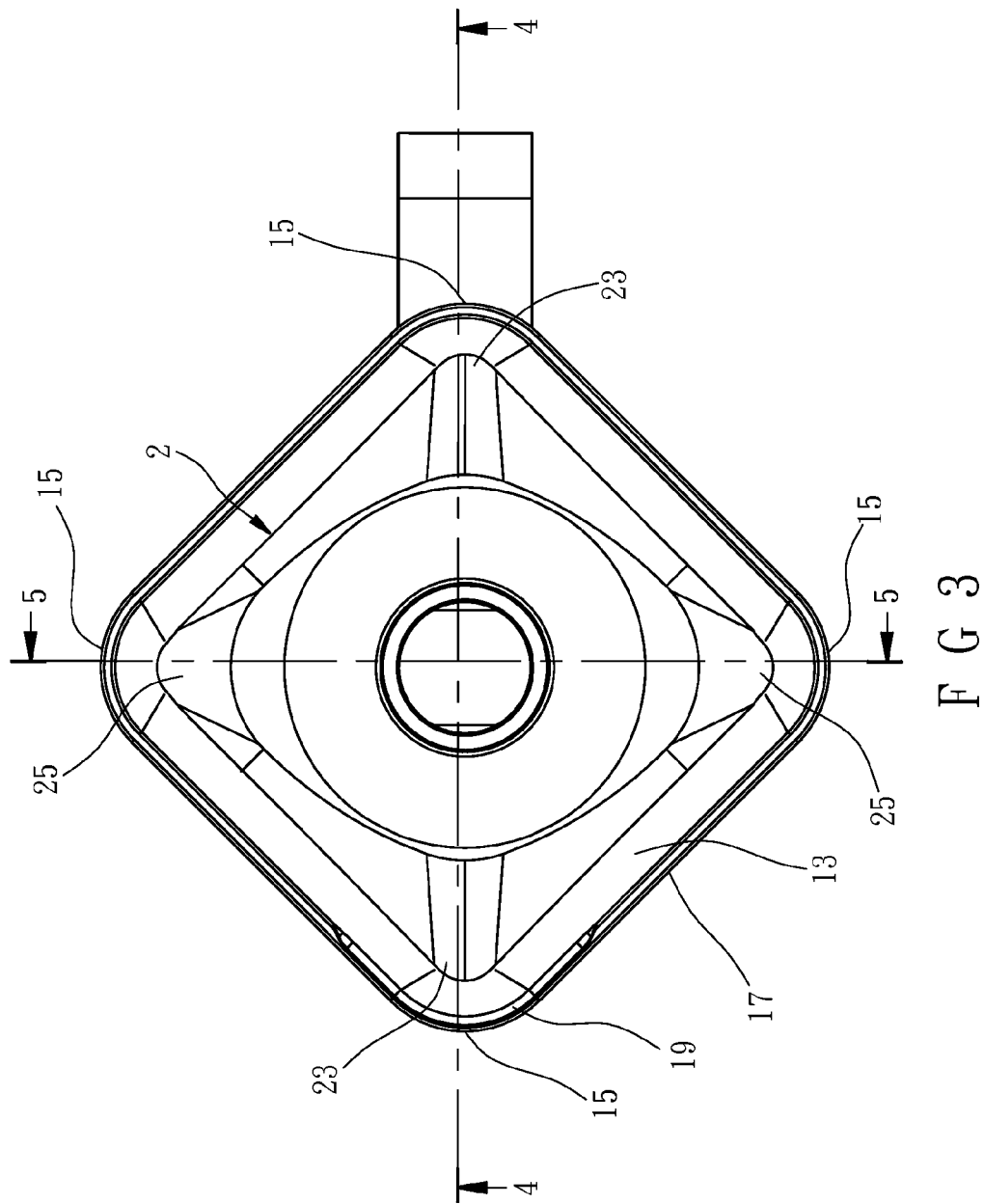
FIG. 3 is a top view of the present invention shown in FIG. 1.
Figure 5:
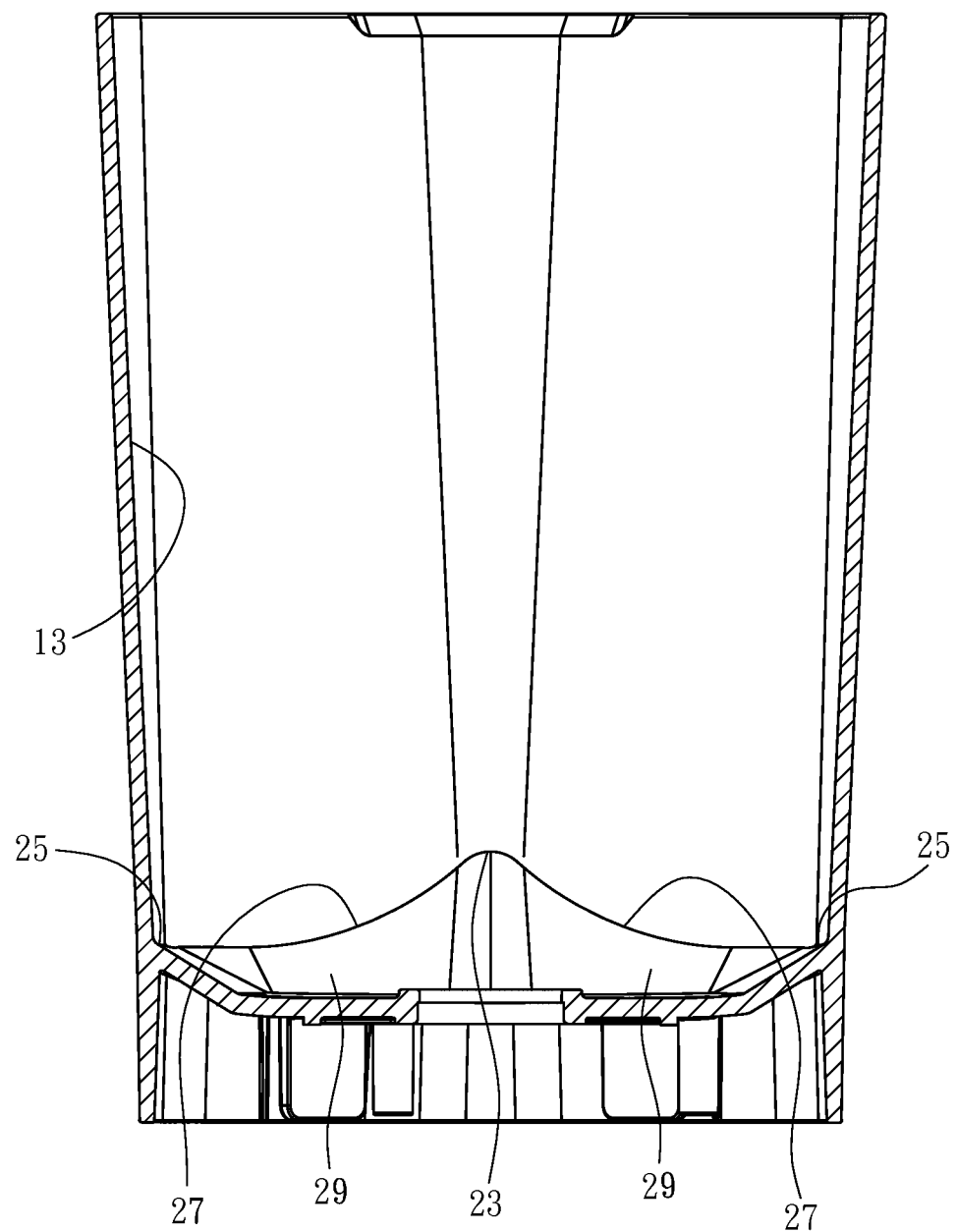
FIG. 5 is a sectional view taken along a line 5-5 indicated in FIG. 3.

Referring to FIGS. 3 and 5, among the turning portions 23,25, the two opposite turning portions 23 are structurally symmetric and so are the two opposite turning portions 25. The either two adjacent turning portions 23,25 are not as high as each other relative to the internal wall surface 13 and the extended curve 27 between is inclined gradually from the higher turning portion 23 toward the lower turning portion 25. In other words, the extended curves 27 are of radian, so an inclination angle of an arc-shaped 29 defined by the turning portions 23,25 and the extended curves 27 is variable subject to the change of the radians of the extended curves 27.

In this embodiment, as the square transparent cup, the container 1 includes four corners 15. Each of the four turning portions 23,25 is located at one of the corners 15. Since the opposite turning portions 23 or 25 are structurally symmetric, the container 1, so the container 1 is internally diagonally symmetric.

The either two adjacent turning portions 23,25 are not as high as each other to be a high turning portion 23 and low turning portion 25. The high and low turning portions 23,25 are adjacent to each other to lead to preferable blending effect, so the food is agitated through the higher and lower turning portions 23,25 without any adverse effect on the whole appearance of the container 1, making the internal wall surface 13 smooth or arc-shaped to get rid of the limitation to the whole appearance of the container 1.

Figure 4:
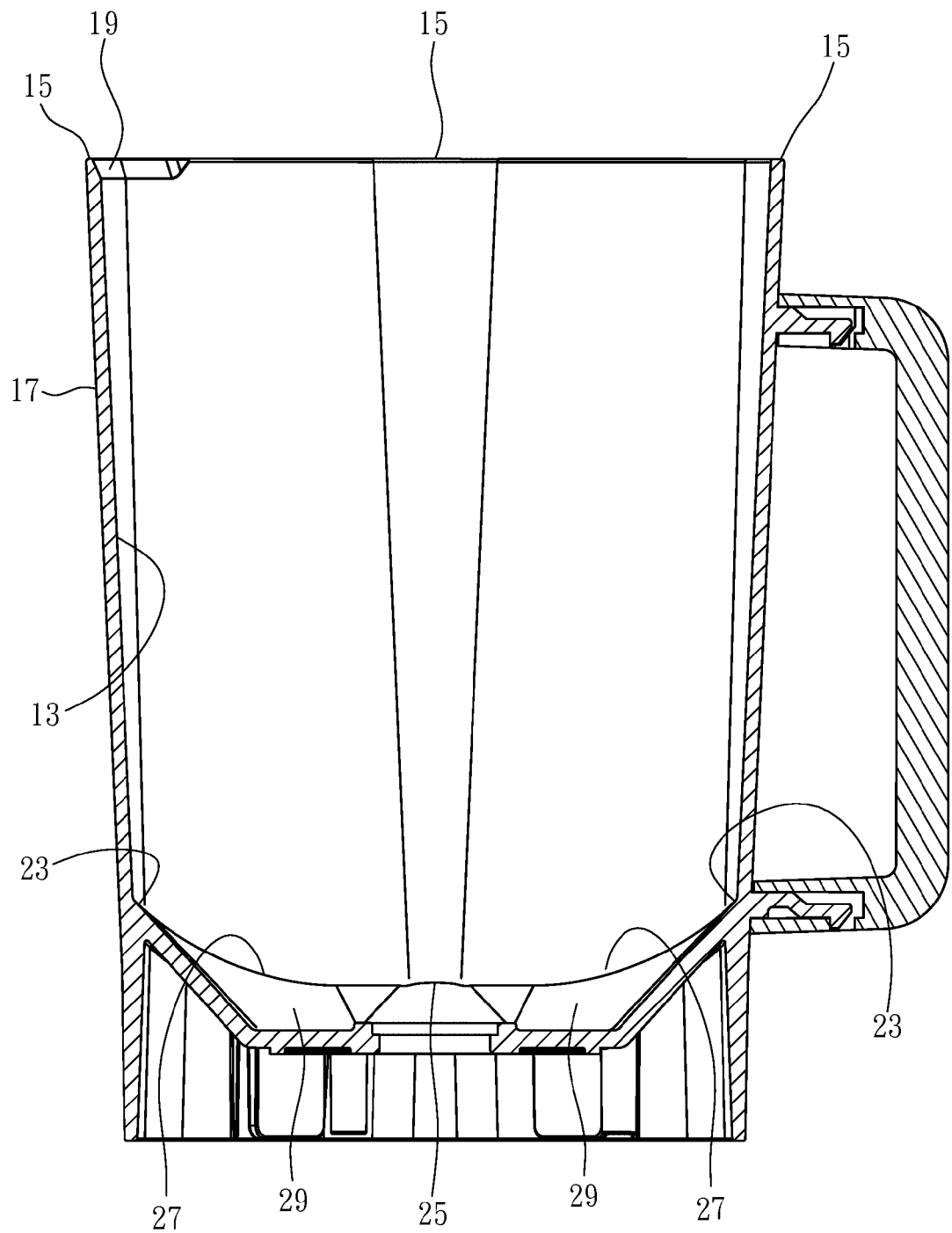
FIG. 4 is a sectional view taken along a line 4-4 indicated in FIG. 3.

Referring to FIGS. 3 and 4, the container 1 further includes an external wall surface 17 and a guiding bevel 19. The guiding bevel 19 is inclined from the internal wall surface 13 toward a top edge of the external wall surface 17 and located at one of the corners 15. In this way, when the juice inside the container 1 is poured outside, the juice will not flow downward along the external wall surface 17, thus preventing the juice from staining the external wall surface 17.

The container in this embodiment is though the square transparent cup as an example for illustration but in practice, the cup can be of either polygon. If the corners of the container 1 are not even in number and the turning portions are not even in number either, the turning portions will not be opposite to each other. However, even so, the blending base can still lead to the preferable blending effect. For this reason, the container is not limited to the square transparent cup and the turning portions of the blending base are not limited to opposite ones.

In addition, the turning portion of the blending base can be as high as the others or each of the turning portions is not as high as either of the others, so the height of the turning portions is not limited to difference.

Although the present invention has been described with respect to a specific preferred embodiment thereof, it is no way limited to the details of the illustrated structures but changes and modifications may be made within the scope of the appended claims.

What is claimed is:

1. A container comprising a blending base, an internal wall surface, and an internal bottom surface, the blending base being formed inside the container and extending upward slantwise from the internal bottom surface to the internal wall surface, a top edge of the blending base having a plurality of turning portions and extended curves, the extended curves being connected to the turning portions;

wherein each two neighboring said turning portions have different heights relative to the internal wall surface.

2. The container as defined in claim 1, wherein each two opposite said turning portions are symmetric with a same height.

3. The container as defined in claim 2, wherein the container is a square transparent cup and comprising a plurality of corners, the turning portions are located at the corners of the square transparent cup, respectively.

4. The container as defined in claim 2 further comprising a blade set mounted therein and located at a center of the blending base.

5. The container as defined in claim 1, wherein the container comprises a plurality of corners and the turning portions are located at the corners, respectively.

6. The container as defined in claim 5, wherein the container comprises an external wall surface and a guiding bevel, the guiding bevel being inclined from the internal wall surface toward a top edge of the external wall surface, and located at one of the corners of the container.

7. The container as defined in claim 1, wherein the container is a square transparent cup and comprising a plurality of corners, the turning portions are located at the corners of the square transparent cup, respectively.

8. The container as defined in claim 1 further comprising a blade set mounted therein and located at a center of the blending base.

* * * * *